Dec. 20, 1938.  C. A. BICKEL  2,140,949
APPARATUS FOR TURNING COMPLEX WORKPIECES
Filed Oct. 22, 1936   12 Sheets-Sheet 5

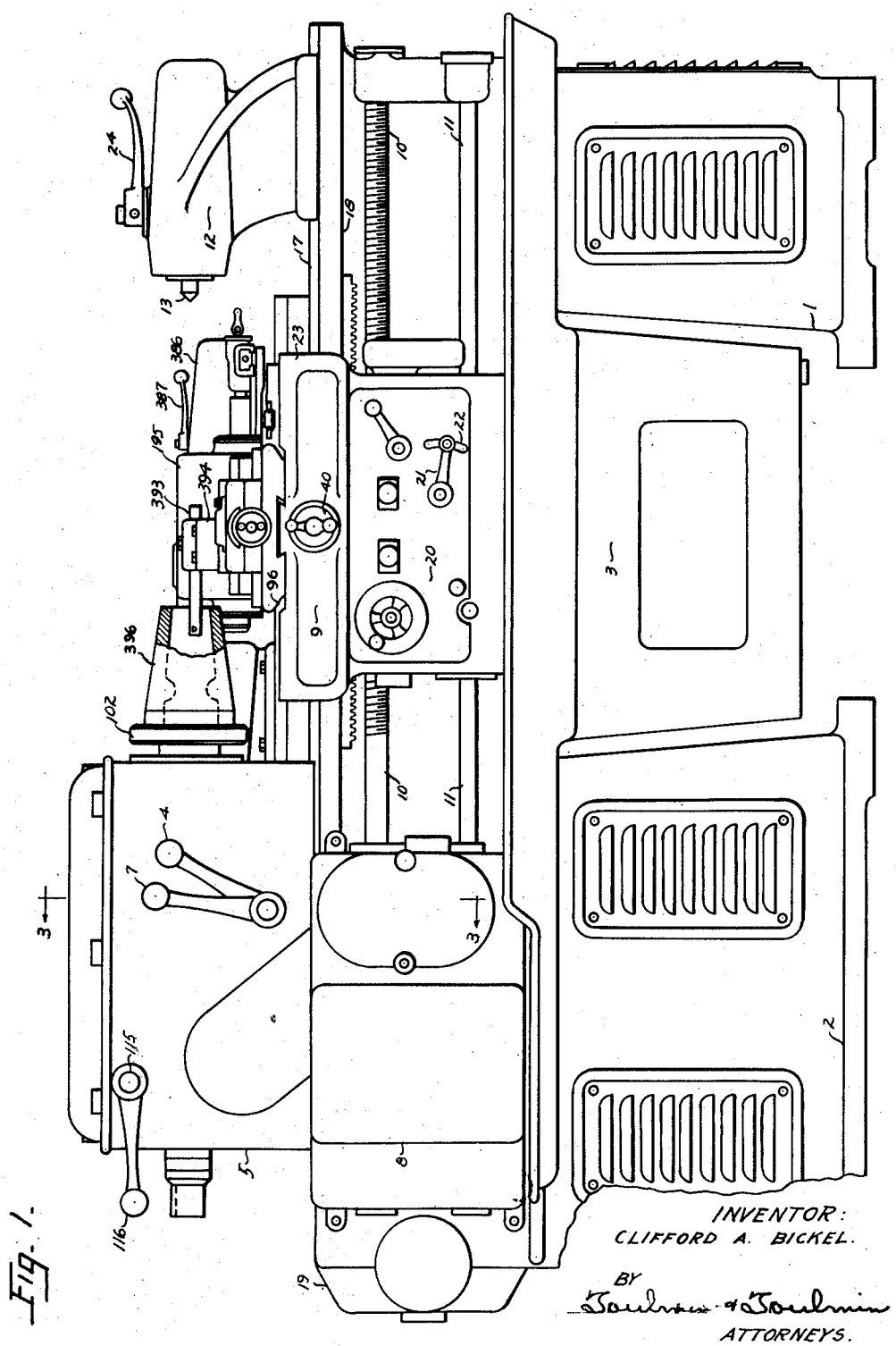

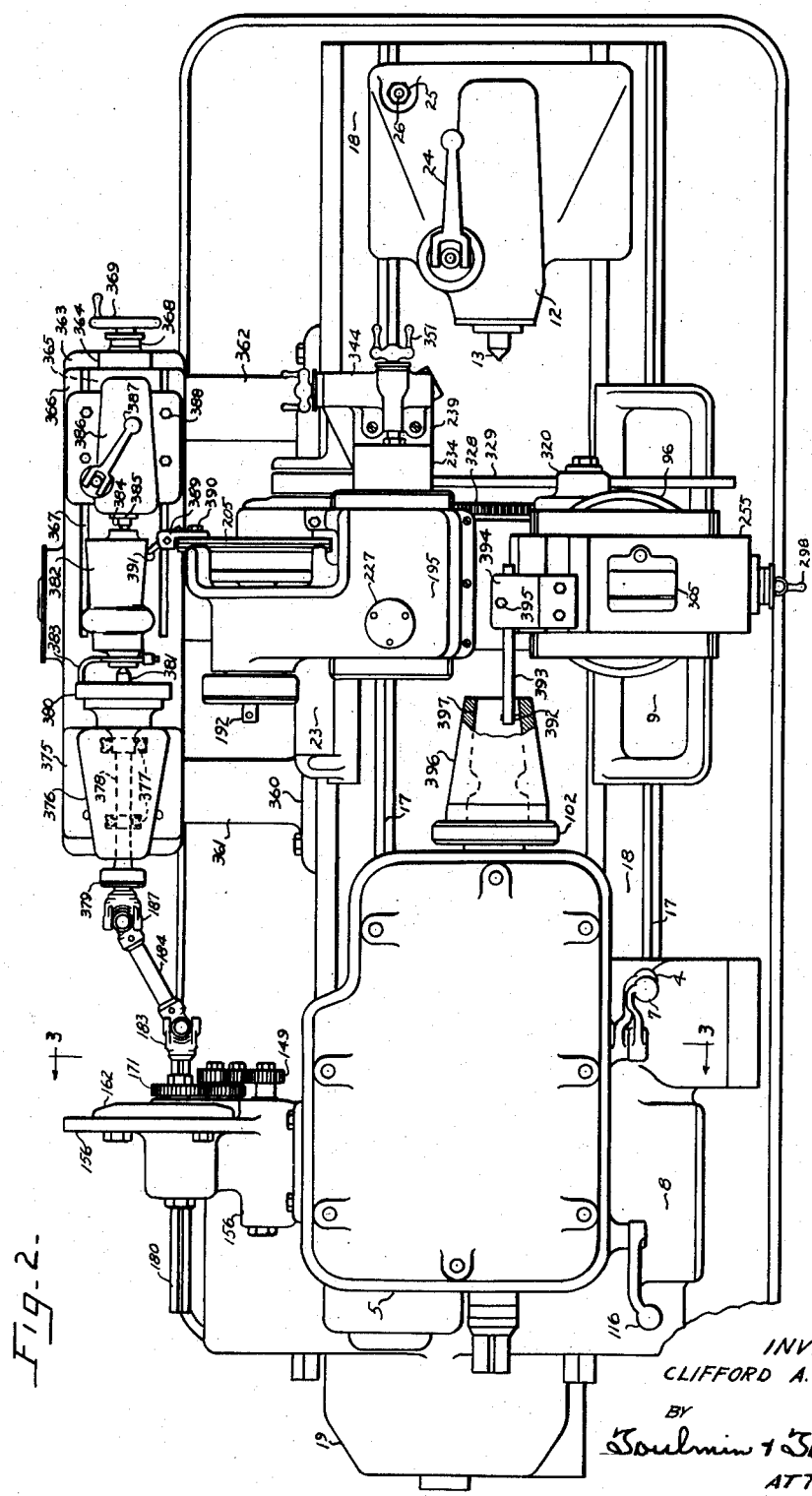

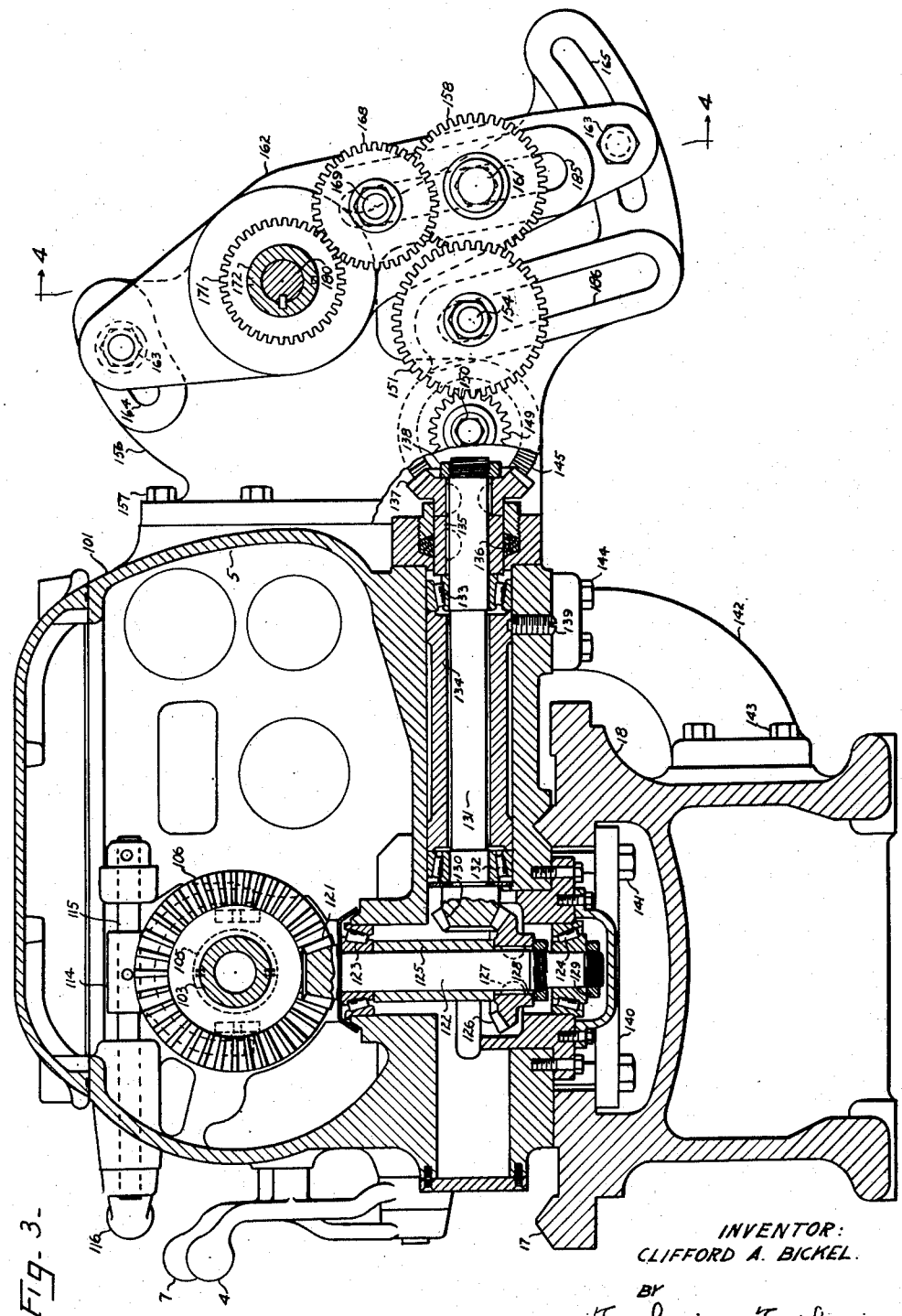

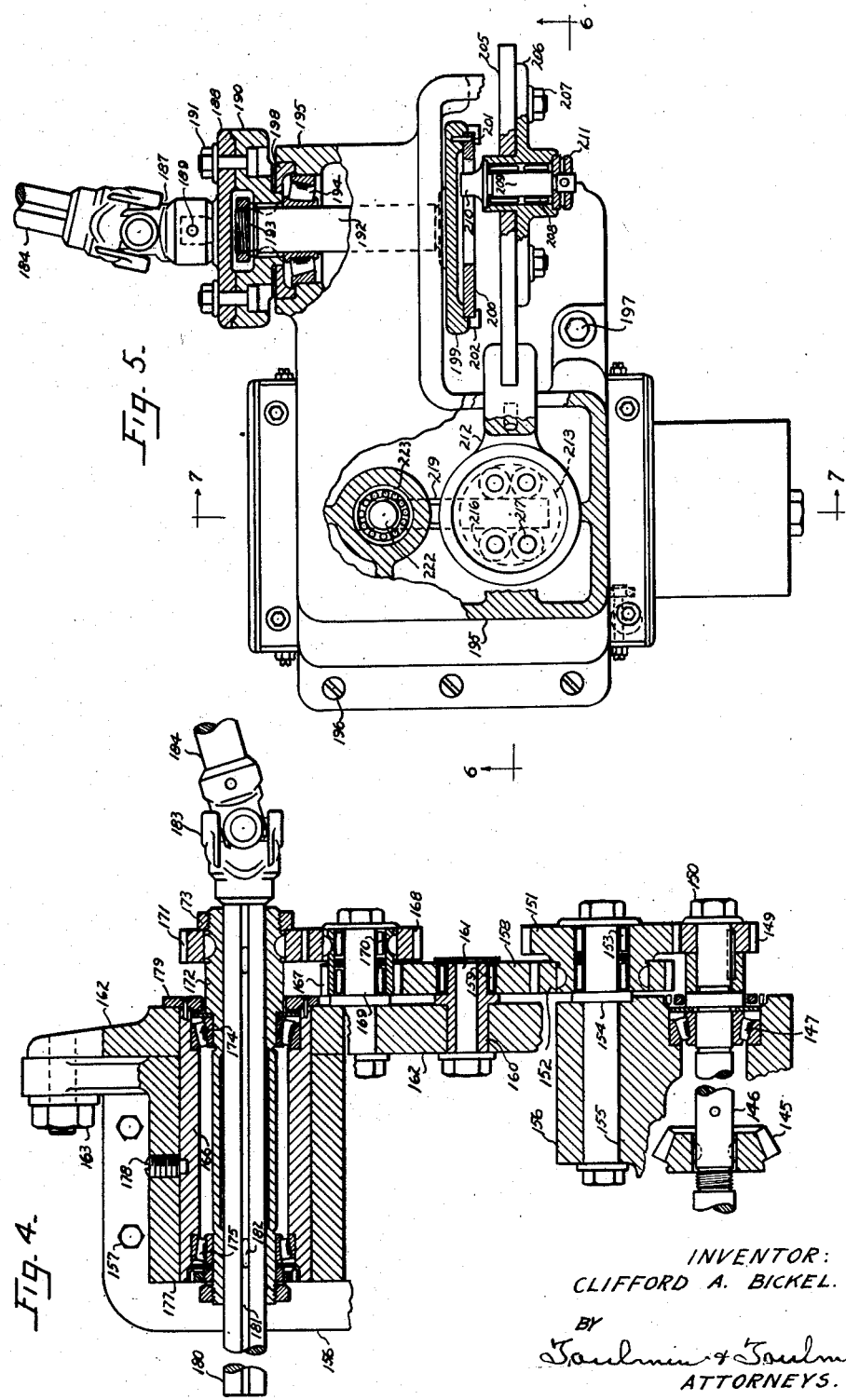

INVENTOR:
CLIFFORD A. BICKEL.
BY
Toulmin & Toulmin
ATTORNEYS.

INVENTOR:
CLIFFORD A. BICKEL.
BY
Toulmin & Toulmin
ATTORNEYS.

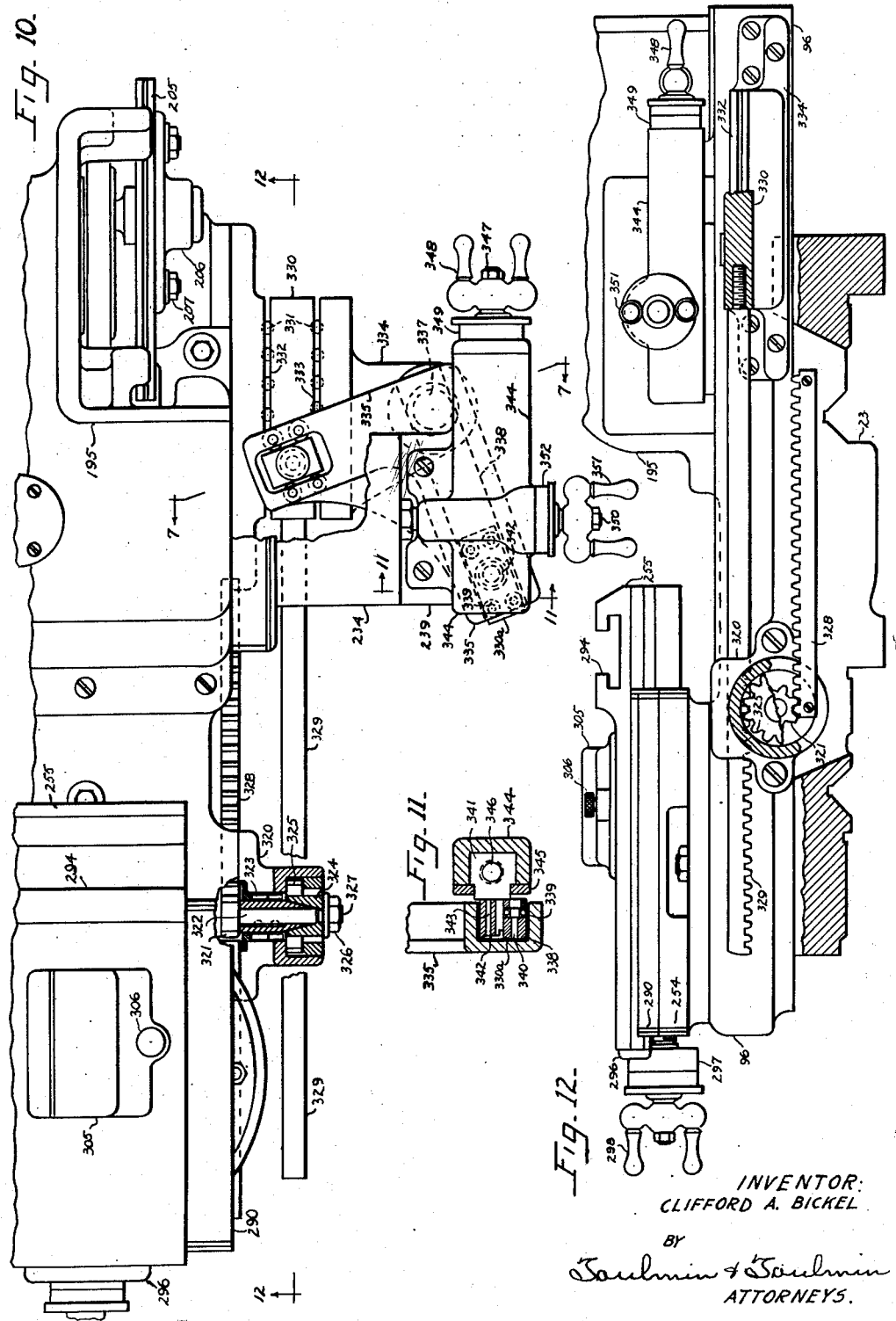

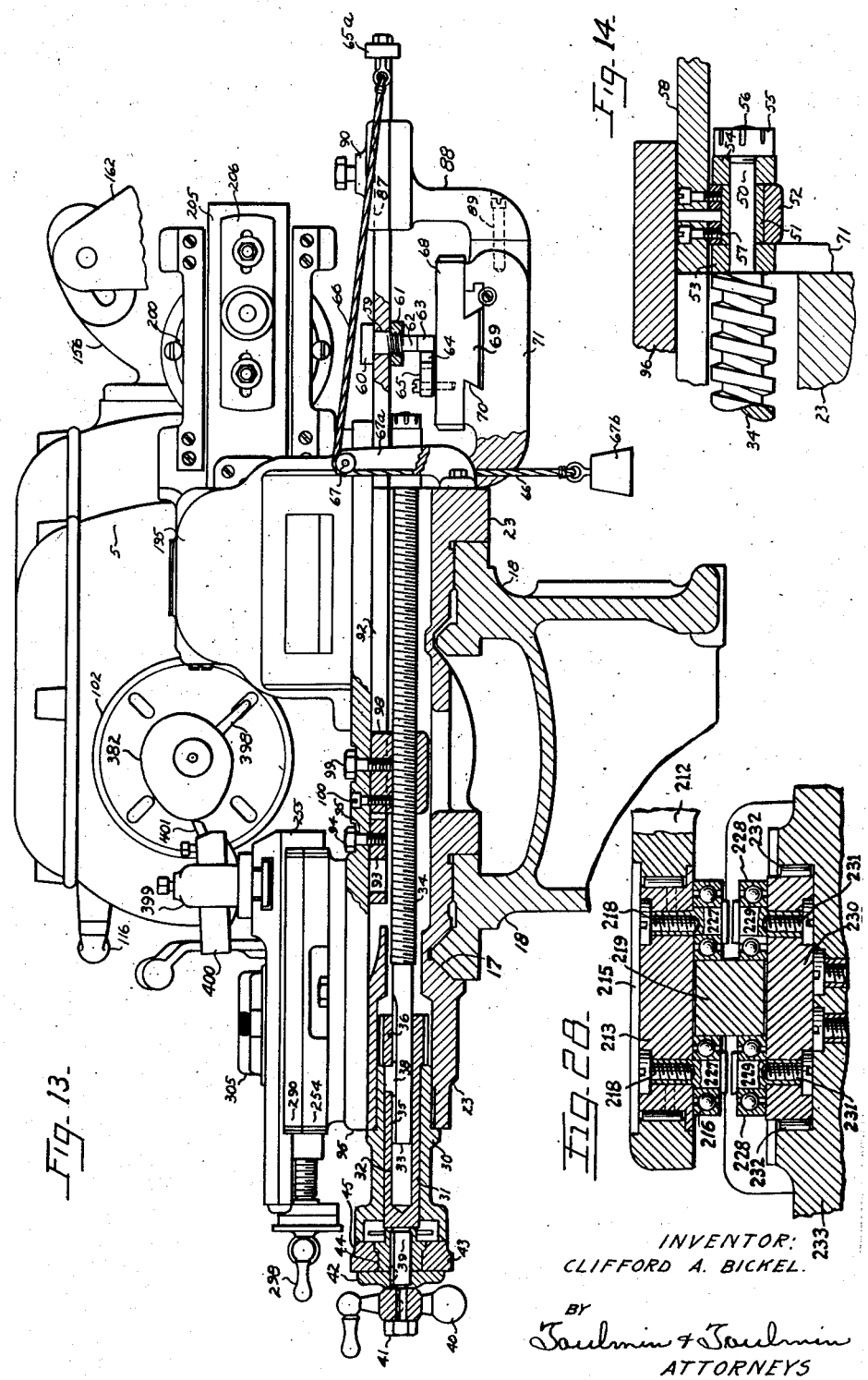

Dec. 20, 1938.  C. A. BICKEL  2,140,949
APPARATUS FOR TURNING COMPLEX WORKPIECES
Filed Oct. 22, 1936  12 Sheets-Sheet 9

INVENTOR:
CLIFFORD A. BICKEL.
BY
Toulmin & Toulmin
ATTORNEYS.

Dec. 20, 1938.   C. A. BICKEL   2,140,949
APPARATUS FOR TURNING COMPLEX WORKPIECES
Filed Oct. 22, 1936   12 Sheets-Sheet 10

INVENTOR:
CLIFFORD A. BICKEL
BY
Toulmin & Toulmin
ATTORNEYS.

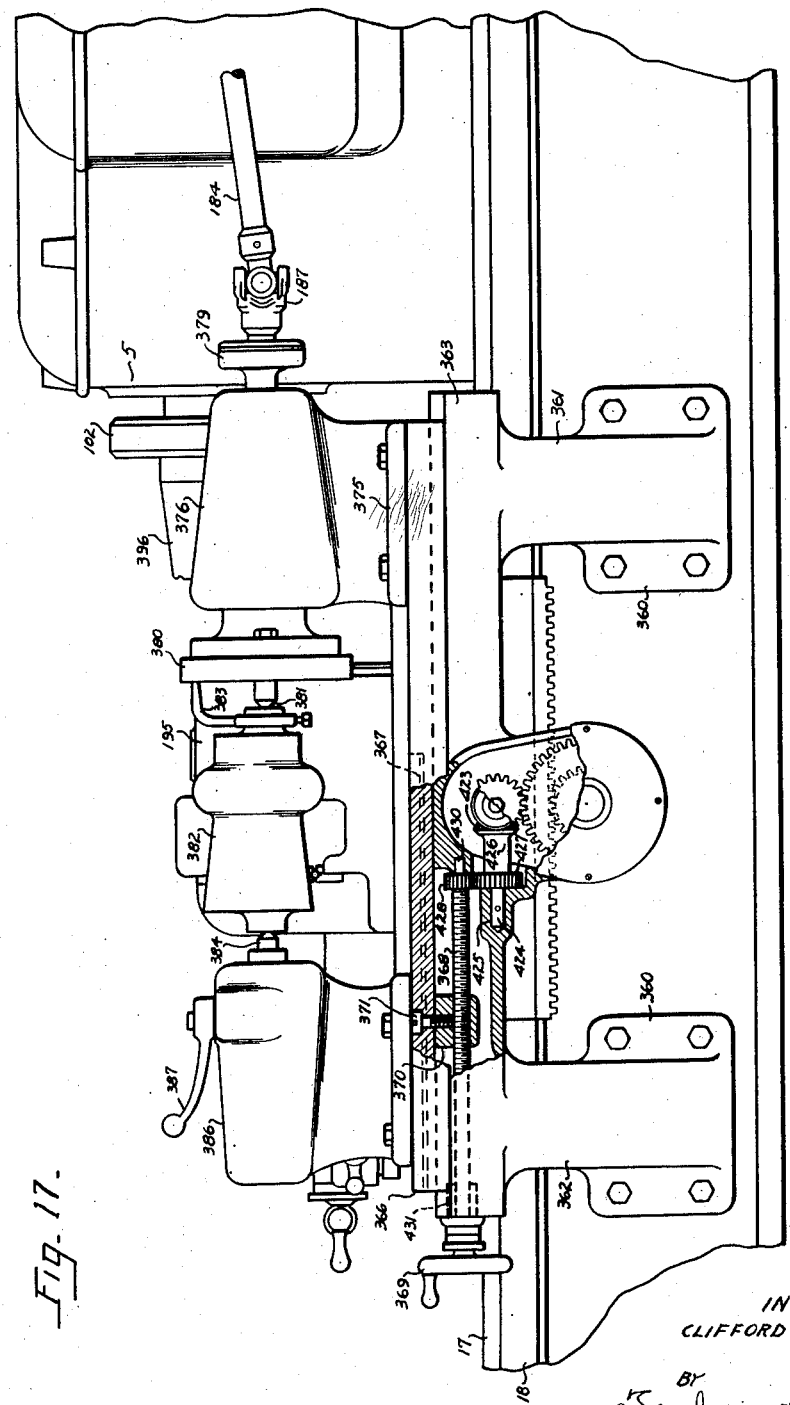

Dec. 20, 1938.  C. A. BICKEL  2,140,949
APPARATUS FOR TURNING COMPLEX WORKPIECES
Filed Oct. 22, 1936   12 Sheets-Sheet 12
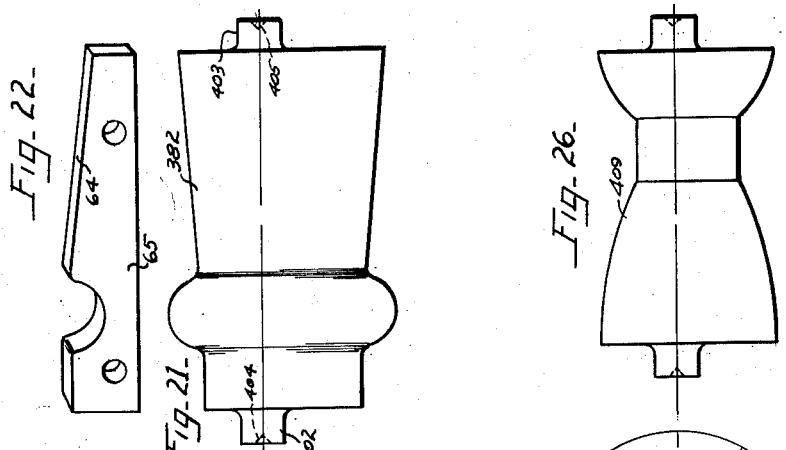
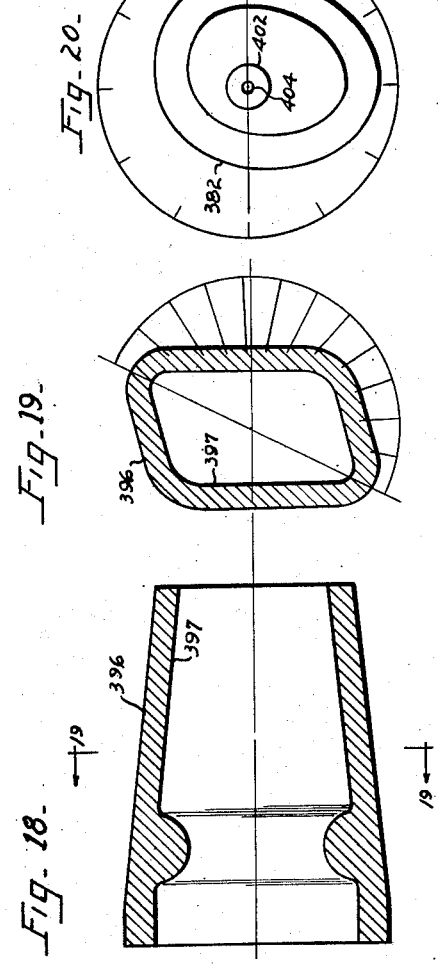
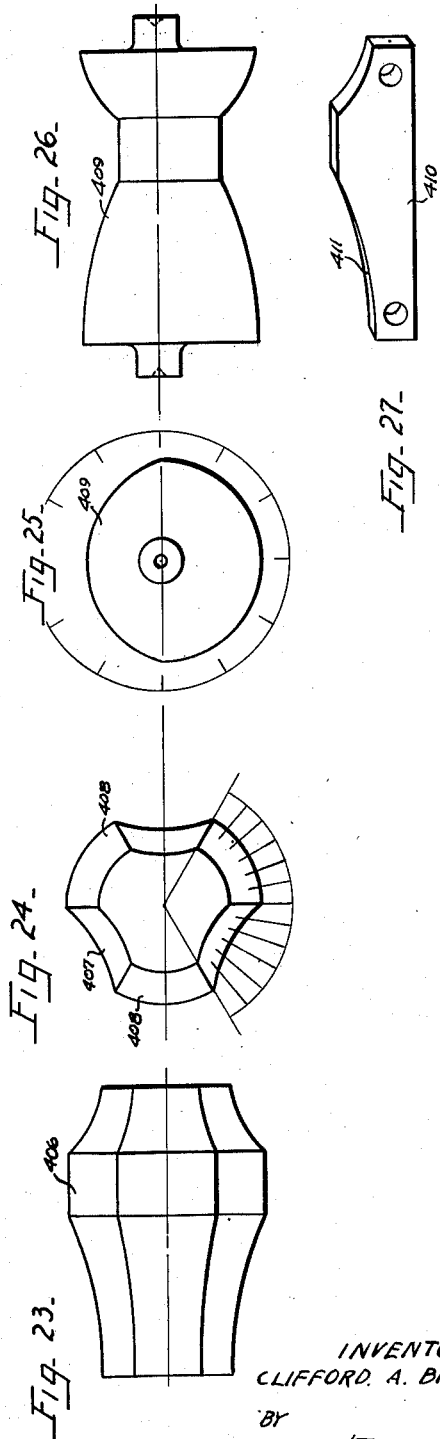
INVENTOR:
CLIFFORD A. BICKEL
BY
Toulmin & Toulmin
ATTORNEYS.

Patented Dec. 20, 1938

2,140,949

UNITED STATES PATENT OFFICE 2,140,949

APPARATUS FOR TURNING COMPLEX WORKPIECES

Clifford A. Bickel, Sidney, Ohio, assignor to The Monarch Machine Tool Co., Sidney, Ohio, a corporation of Ohio Application October 22, 1936, Serial No. 106,953

19 Claims. (Cl. 82—19)

This invention relates to lathes, and in particular, to apparatus for turning complex work-pieces such as those of non-circular cross section, together with methods for forming such work-pieces.

One object of this invention is to provide a machine for turning complex work-pieces with the aid of a three-dimensional cam member which not only predetermines the configuration of the work-piece in a given cross sectional plane, but also in other planes along the work-piece.

Another object is to provide a machine having mechanism associated therewith and employing a three-dimensional cam having in a complete revolution a configuration adapted to reproduce a portion only of a revolution in the work-piece, the cam and the work-piece being rotated at different speeds.

Another object is to provide such apparatus as that described immediately above, wherein compensating devices are associated with the mechanism whereby the cutting tool is given a compensated motion to allow for the motion of the tool in turning tapered work-pieces, or those having different diameters therealong.

Another object is to provide apparatus for producing the three-dimensional or "length" cams employed in connection with the turning of objects of irregular cross section.

Another object is to provide a machine for producing these three-dimensional cams wherein the configuration transversely is determined by a rotating cam formed from a representative cross section of the work-piece and the longitudinal configuration is obtained by means of a profile member, the combination of these two elements resulting in the three-dimensional cam referred to.

Another object is to provide such apparatus as described immediately above, wherein the cross sectional cam and the three-dimensional cam being produced are rotated at different speeds so that the three-dimensional cam will receive, in a complete revolution, but a portion of the configuration of a complete revolution of the cross sectional cam, the necessary compensation for the taper of the work-piece being taken care of by certain compensating mechanism arranged between the cam follower and the cutting tool.

Another object is to provide a machine for turning work-pieces of irregular cross section wherein means is provided for elongating the effect of the length or three-dimensional cam by providing the cam with longitudinal motion relatively to the cam follower so that the cam has the effect of a lengthened cam, thereby eliminating the necessity for producing additional cams in order to make work-pieces of greater length but of similar cross section.

Another object is to provide apparatus for turning or boring work-pieces which do not have a common cross section from which a cross section can be taken to develop the cross sectional cam; in which case there is provided means for producing a master length cam in which a longitudinal section is taken and developed into 360 degrees or a complete revolution in making the length cam.

In the drawings:

Figure 1 is a front elevation of a machine employing a three-dimensional cam or length cam for turning work-pieces of irregular cross section.

Figure 2 is a top plan view of the machine shown in Figure 1.

Figure 3 is a cross section along the line 3—3 in Figure 1, showing a portion of the head stock mechanism.

Figure 4 is a lay-out developed section through the change gear and associated mechanism, shown at the right-hand side of Figure 3.

Figure 5 is a top plan view, partly broken away, of the operating cam assembly and its associated parts.

Figure 10 is a top plan view, partly in section, of the carriage mechanism, embodying the non-circular work-piece turning arrangement of this invention and showing the compensating mechanism employed in turning tapered work-pieces.

Figure 11 is an enlarged cross sectional view along the line 11—11 in Figure 10.

Figure 12 is a vertical section along the line 12—12 in Figure 10.

Figure 13 is a vertical section through the axis of the cross feed screw of the carriage and length profile attachment of the machine shown in Figures 1 and 2, but arranged for producing a three-dimensional cam as shown in Figure 15.

Figure 14 is an enlarged detail cross section of a portion of Figure 13, showing the connection of the cross feed screw with the operating bar of the tool slide.

Figure 17 is a rear elevation, partly broken away, of the mechanism shown in Figure 16.

Figure 18 is a longitudinal section through a sample work-piece adapted to be produced by the machine of this invention.

Figure 19 is a cross section through the work-piece of Figure 18, taken along the line 19—19 thereof.

Figure 20 is a left-hand end elevation of Figure 21, showing the length cam or three-dimensional cam employed in producing the work-piece of Figures 18 and 19.

Figure 21 is a top plan view of the length cam shown in Figure 20.

Figure 22 is a perspective view of the length profile member employed in producing the length cam shown in Figures 20 and 21.

Figure 23 is a side elevation of another sample work-piece of a different shape from that of Figure 18, and adapted to be produced by the machine of this invention.

Figure 24 is a right-hand end elevation of the work-piece shown in Figure 23.

Figure 25 is a left-hand end elevation of Figure 26, showing the end of the length cam from which the work-piece of Figures 23 and 24 is produced.

Figure 26 is a side elevation of the length cam shown in end elevation in Figure 25.

Figure 27 is a perspective view of a length profile member employed in producing the length cam of Figures 25 and 26.

Figure 28 is a central axial section through one of the anti-friction bearing assemblies used in the machine of this invention, and enlarged from a portion of Figure 6.

*General construction*

Figure 6:
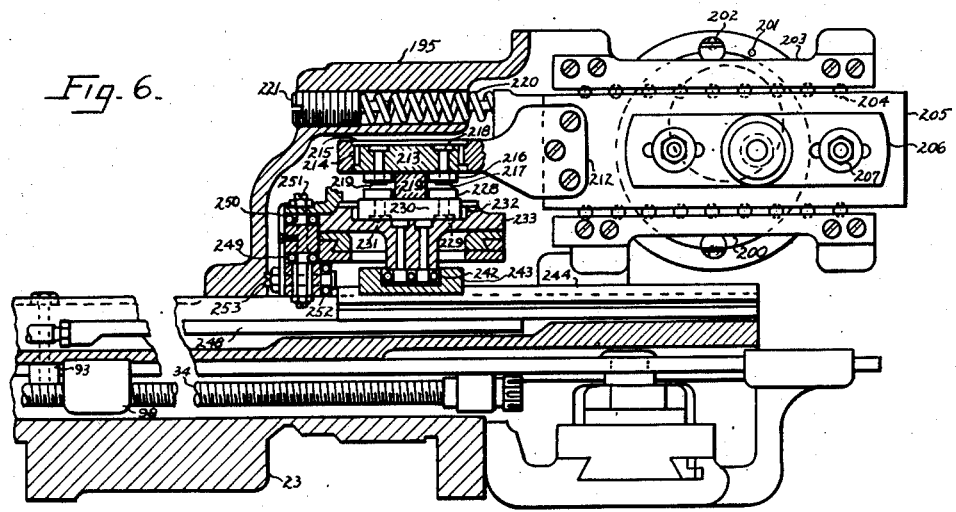
Figure 6 is a vertical section along the line 6—6 in Figure 5.

The machine of this invention in general consists of a lathe or lathe-like apparatus employing a length cam or three-dimensional cam of special configuration determined by the cross section and profile of the work-piece to be cut. This length cam is driven in timed relationship with the spindle which rotates the work-piece, and operates a series of levers and slides to transmit the motion derived from the length cam to the cutting tool as the latter is moved by the carriage longitudinally of the work-piece. A compensating arrangement is included in this mechanism, and has the result of modifying the feeding action of the cutting tool to compensate for the tapering effect of the work-piece. The length cam itself has a cross section developed in a complete revolution or 360 degrees from a partial revolution of the work-piece to be produced. In general, this partial revolution is such as to include an angle during which the configuration of the work-piece does not repeat itself for the same shape, and terminates where this repetition begins. For a pyramidal work-piece, therefore, the developed portion will include only a quarter portion of the cross section, where this cross section is a square or a rectangle; and a third of a revolution where this cross section is a triangle.

The machine of this invention consists primarily of a mechanical system, including the length cam, gearing, slides and lever arms with index plates and dials for properly setting the machine, according to predetermined plans. Mechanism is associated with the head stock of the lathe for providing the multiplicity of speeds necessary for rotating the cam in timed relationship with the work-piece rotating shaft or main spindle. The mechanism which actuates the cutting tool itself is mounted upon the carriage and cross slide in much the same manner as the compound rest. The drive for this mechanism is obtained through an auxiliary shaft and universal joints from the head stock mechanism, certain change speed gearing being interposed in this system to enable various relative speeds to be obtained between the cam shaft and the work-piece rotating shaft. In the drawings there is shown a machine consisting of a standard lathe having a carriage and auxiliary mechanism, modified in accordance with the teachings of this invention. This employment of a standard lathe is solely for convenience of showing, however, and it will be understood that a more specialized mechanism may be employed for providing the necessary drives for the cam shaft and main spindle, respectively.

Figure 15:
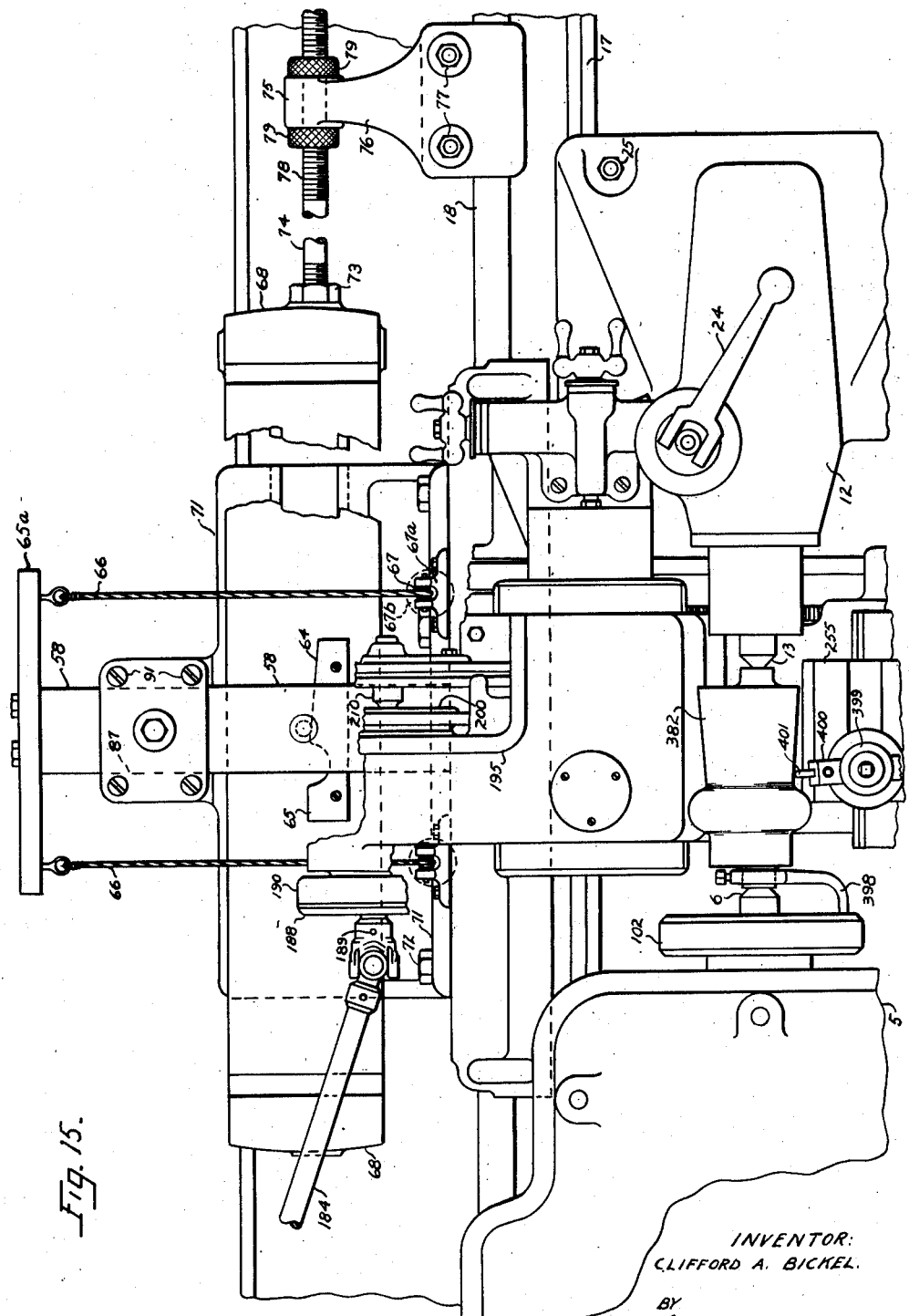
Figure 15 is a top plan view of the mechanism shown in Figure 13 for producing a three-dimensional or length cam with the aid of a cross sectional cam and a length profile member.
Figure 16:
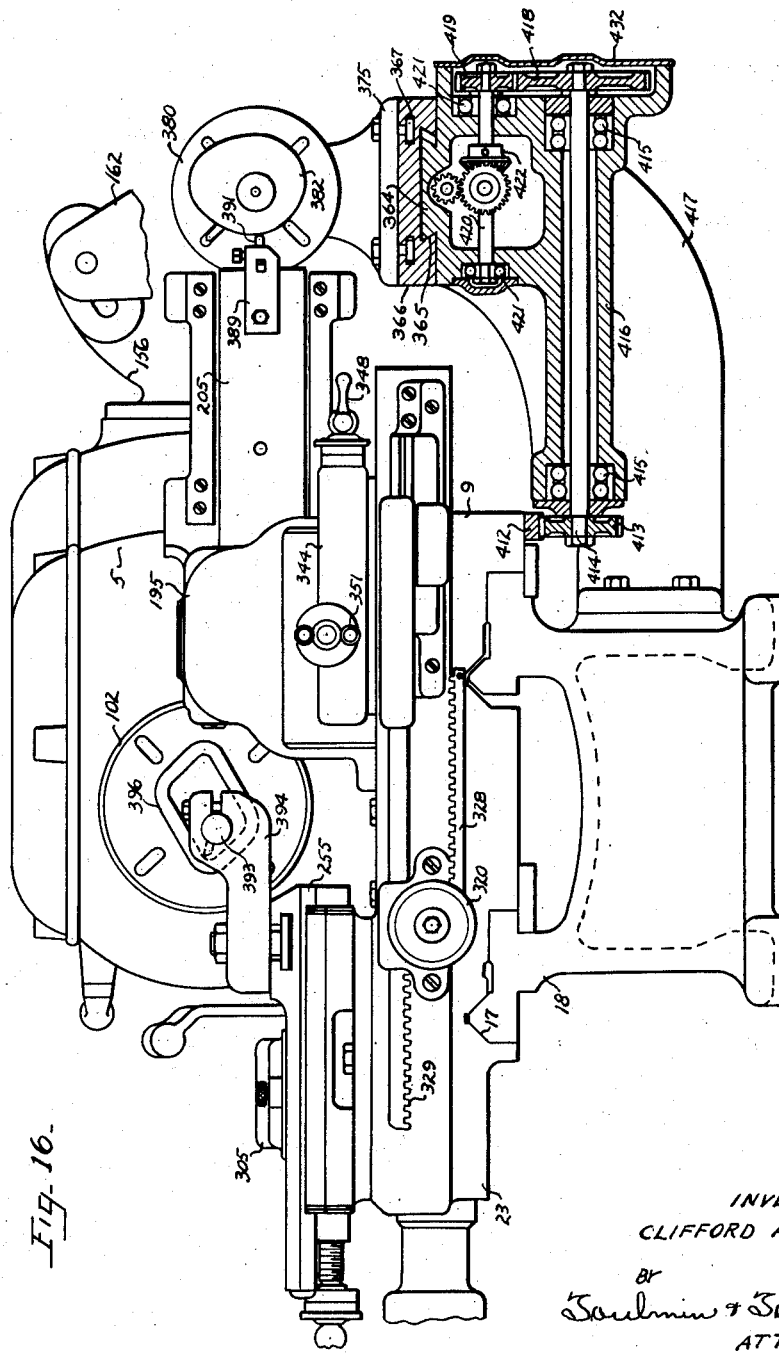
Figure 16 is a right-hand end elevation, partly in section, of a modification of the machine shown in Figures 1 and 2, with the tail stock removed and arranged for turning an elongated work-piece from a shorter length cam.

The disclosure herein, as contained in Figures 1 to 12, inclusive, is devoted to the machine as arranged for turning a work-piece of irregular cross section and length profile from a master length cam developed from but a partial revolution of the work-piece to be produced. The machine arranged for the production of this master length cam itself is disclosed in Figures 13 to 15, inclusive. The machine modified to utilize a given master length cam for producing a multiplicity of work-pieces of different lengths is shown in Figures 16 and 17. Two different types of work-pieces and the length cams for producing them, together with the length profile members for producing the length cams, are shown in Figures 18 to 27, inclusive.

*General construction of machine*

Referring to the drawings in detail, Figures 1 and 2 show the machine of this invention as arranged for turning work-pieces of complex cross section and length with the aid of a three-dimensional cam or length cam developed from but a partial revolution of the work-piece.

In Figure 1 there is shown, for example, a lathe having hollow base legs 1 and 2 supporting the intermediate pan 3 and having louvers for ventilation. The lathe is provided with a head stock generally designated 5, having a head stock center or live center 6 upon which the work-piece is rotated. The head-stock 5 is provided with change speed gearing actuated by the head stock gear shift levers 4 and 7. The lathe is likewise provided with a gear box, generally designated 8, the mechanism of which communicates with the lathe carriage, generally designated 9, through the lead screw 10 and the feed rod 11. Opposed to the head stock or live center 6 is a tail stock, generally designated 12, having a tail stock center or dead center 13. The lathe is likewise provided with a bed plate 18 having ribbed ways 17. The left-hand end of the machine is provided with a clutch contained in the clutch guard 19.

The mechanism by which the power is communicated from a motor mounted within the base leg 2 to the head stock center 6 is not a subject of the present invention, and may consist of any appropriate mechanism such as is known to those skilled in the art. Similarly, the mechanism in the gear box 8 for operating the lead screw 10 and feed rod 11 may be of conventional design, and does not form a subject of the present invention.

The carriage 9 is moved to and fro along the ways 17 by means of mechanism contained in the apron 20 thereof, the direction of motion being controlled by the lever 21 operating in the arcuate groove 22. The mechanism contained within the apron 20 is likewise of a conventional design, and does not form a subject of the present invention. The details of the mechanism in the carriage 9 and the non-circular work-piece turning arrangement associated therewith will be discussed later. This mechanism is mounted upon the carriage base 23, from which the apron 20 depends.

The tail stock 12 is likewise mounted on the ribbed ways 17, and its dead center 13 may be moved to and fro by turning the clamping handle 24 which operates a pinion engaging a rack (not shown) for moving the dead center 13 in an axial direction. The use of the same handle 24 serves to lock the rack in a fixed position and consequently to clamp the dead center 13 in an immovable location. The tail stock 12 itself may be adjusted bodily along the ways 17 of the lathe bed 18 by loosening the nut 25 which tightens the clamping bolt 26 and thereby clamping the tail stock 12 to the lathe bed 18.

*Length profile attachment and associated carriage mechanism*

The carriage base 23 (Figure 13) which reciprocates along the ribbed ways 17 of the lathe bed 18 is provided with a bushing 30 within which is rotatably mounted the sleeve 31 containing a bore 32 adapted to receive the end 33 of the cross feed screw, generally designated 34. A keyway 35 provides a driving connection between the sleeve 31 and the cross feed screw 34, yet permits the plain portion 33 thereof to move to and fro longitudinally within the bore 32 of the sleeve 31. A pinion 36 is associated with the sleeve 31. The key 38, associated with the sleeve 31, engages the keyway 35 and forms a driving connection therebetween.

The pinion 36 meshes with a gear (not shown) which is rotated by the conventional mechanism contained in the carriage apron 20, and forming no part of the present invention. The sleeve 31 terminates in a shaft portion 39, to the outer end of which is secured the hand crank 40, as by the nut 41. Also secured to the shaft portion 39 is a disc 42 located against the collar 43 surrounding the sleeve 44, and having a cylindrical micrometer dial 45 associated therewith.

The inner end of the cross feed screw 34 (Figure 14) is provided with a reduced diameter portion 50 surrounded by a bearing sleeve 51, supported by the member 52 between the thrust bearings 53 and 54, the whole being held in assembled condition by the nut 55 on the threaded end 56 of the cross feed screw portion 50. The member 52 is secured by the screws 57 to the operating bar 58. The latter is provided with a hole 59, through which passes the stud bolt 60, the end of which is secured within the threaded hole 59 by the nut 61. The stud bolt 60 on its lower end 62 carries a follower roller 63 adapted to engage the guiding edge 64 of the length profile member 65 so as to transmit the configuration thereof to the operating bar 58. To the latter is bolted an anchorage member 65a, having cables 66 attached thereto. The cables 66 pass over pulleys 67 mounted in the brackets 67a bolted to the carriage 9, and terminate in weights 67b. This arrangement serves to keep the follower roller 63 in engagement with the length profile member 65. The length profile member 65 is bolted to the slide 68, the latter having a dove-tailed portion 69 arranged to slide within the ways 70 of the bracket 71. The bracket 71 is secured, as by the bolts 72, to the base portion 23 of the lathe carriage 9. Threaded into one end of the slide 68 and locked thereto by the locknut 73 is an anchor rod 74 (Figure 15), the end of which passes through a bore 75 in the bed clamp 76, the latter being clamped to the lathe bed 18 by bolts 77. The outer end of the anchor rod 74 is threaded, as at 78, and carries locknuts 79 by which it is anchored to the bed clamp 76.

The outer end of the bar 58 (Figure 13) passes through a slot 87 in the upper end of the auxiliary bracket 88 secured to the bracket 71 by the screws 89. The slot 87 is provided with a retaining plate 90 secured therto by the screws 91. The opposite end of the operating bar 58 is provided with an elongated slot 92, within which is arranged a clamping member 93 having a bolt 94 threaded therein. The bolt 94 passes through a hole 95 in the transverse slide 96 and is so arranged that when the bolt 94 is tightened, it draws the clamping member 93 into tight engagement with the bottom of the bar 58 so as to lock the transverse slide 96 to the bar 58, thereby making these two members temporarily a solid unit. When the bolt 94 is loosened, however, the clamping member 93 is released so that the transverse slide 96 may move relatively to the bar 58. Under the latter condition, the transverse slide 96 may be moved to and fro through the action of the cross feed screw 34 whose threads engage the cross feed nut 98, secured by the bolt 99 and screw 100 to the transverse slide 96. The transverse slide 96 is moved to and fro under the influence of the cross feed screw 34, rotated by the hand wheel 40 so that the cutting tool can be positioned to the work, and the bolt 94 is then tightened to lock the bar 58 rigidly to the transverse slide 96. The transverse slide 96, as will hereinafter appear, supports much of the mechanism constituting the non-circular workpiece turning arrangement, including the cutting tool by which the work-piece is actually turned.

*Head stock power take-off and change speed mechanism*

The head stock 5 (Figure 3) is provided with a housing 101 containing various change speed gearing for imparting variable speeds to the head stock or work spindle 103. This change speed mechanism forms no part of the present invention and is of any conventional type known to those skilled in the art. The head stock center 6 is mounted in the rotatable head 102, which is a part of the head stock or work spindle 103. The latter carries a sleeve 105 supporting the bevel gear 106 and connected to the work spindle 103 by clutch mechanism (not shown) actuated by way of the shifting yoke 114 on the shaft 115 by the hand lever 116 (Figure 3).

Meshing with the bevel gear 106 is the pinion portion 121 of the pinion shaft 122, the latter being journaled at its opposite ends in anti-friction bearings 123 and 124 (Figure 3). A sleeve 125, mounted upon the pinion shaft 122, serves to space the spiral bevel gear 126, keyed as at 127, to the pinion shaft 122. A nut 128 holds the spiral bevel gear 126 in assembly with the spacing sleeve 125, whereas a nut 129 retains the anti-friction bearing 124 in its proper position relative to the pinion shaft 122. The spiral bevel gear 126 meshes with and drives the pinion portion 130 of the pinion shaft 131, this being supported at its opposite ends by the anti-friction bearings 132 and 133 in the head stock housing 101. The pinion shaft 131 carries a spacing sleeve 134 for properly spacing the anti-friction bearings 132 apart from each other along the pinion shaft 131. The outer end of the pinion shaft 131 carries a collar 135 keyed thereto and engaged by a packing 136 to prevent the escape of lubricant. Also keyed to the outer end of the pinion shaft 131 is a bevel gear 137 which is held in place by the nut 138 threaded onto the end of the pinion shaft 131. The spacing sleeve 134 is spaced apart from the pinion shaft 131 and is locked to the head stock housing 101 by the screw 139. The head stock itself is secured to the lathe bed 18 by the clamping bar 140 anchored thereto by the clamping bolts 141 (Figure 3). The lathe bed 18 also supports a bracket 142 secured thereto by the bolts 143, having its upper end bolted, as at 144, to the bottom of the head stock 5, thereby providing additional support.

Meshing with the bevel gear 137 (Figure 4) is a bevel pinion 145, keyed to the shaft 146 rotatably mounted in the anti-friction bearings 147, mounted in the change gear housing 156, which is bolted, as at 157 (Figure 3), to the rear of the head stock 5. Keyed to the outer end of the shaft 146 is a pinion 149 secured thereto by the nut 150 threaded upon the end of the shaft 146. Meshing with the pinion 149 is a compound idler gear 151, which carries a gear 152 keyed thereto (Figures 3 and 4). The compound idler gear 151 is mounted upon anti-friction bearings 153, which in turn, are supported by the stud shaft 154 mounted in the bore 155 of the change gear housing 156. The latter is bolted by the bolts 157 to the rear of the head stock 5.

Meshing with the gear 152 is an idler gear 158, supported by the anti-friction bearings 159 upon the sleeve 160 surrounding the stud shaft 161 mounted in the quadrant 162. The quadrant 162, at its opposite ends, is provided with the bolts 163 (Figure 3), which pass through the arcuate slots 164 and 165 respectively. The quadrant 162 is pivoted around the outer sleeve 166 (Figure 4) located in the change gear housing 156. Meshing with the idler gear 158 is a compound idler gear 167, to which is keyed the compound gear 168, the whole being mounted upon the stud shaft 169 supported by the quadrant 162.

Anti-friction bearings 170 are arranged between the hub of the idler gear 167 and the stud shaft 169. The idler gear 168 meshes with a pinion 171, keyed to the inner sleeve 172 and held in place thereon by the nut 173. The inner sleeve 172 is mounted on anti-friction bearings 174 and 175 (Figures 3 and 4), these being, in turn, supported by the outer sleeve 166, the latter being anchored in the bore 177 to the quadrant 162 by the screw 178. The gland 179 additionally serves as a locating collar for the quadrant 162. The inner sleeve 172 is arranged to receive the telescoping drive shaft 180, having a keyway 181 engaged by the keys 182 mounted in the inner sleeve 172. In this manner the telescoping drive shaft 180 may move axially into and out of the inner sleeve 172 and yet constantly receive a driving connection therefrom. Mounted on the telescoping drive shaft 180 is a universal joint 183. Connected to the universal joint 183 is the intermediate drive shaft 184, which serves to drive the non-circular work-piece turning mechanism mounted on the carriage 9 in a manner hereinafter described.

The quadrant 162 (Figure 3) is provided with a slot 185 and the change gear housing 156 with a slot 186 for adjustably receiving the stud shafts supporting the gears 158, 168 and 151, respectively. By interchanging these gears, or substituting gears with different numbers of teeth therefor, it is possible to vary the speed of the intermediate shaft 184 between wide limits relatively to the speed of the work spindle 103 (Figure 3). In this manner the cam hereinafter described for actuating the work-piece is provided with a drive which rotates it a multiple number of revolutions for every revolution of the work spindle 103. By reference to a table giving the various gear combinations and speeds obtainable thereby, suitable gears may be set up in the gear train located in the quadrant 162 and change gear housing 156 so as to drive the intermediate shaft 184 in any relationship relatively to the work spindle 131, depending upon the nature of the work-piece.

*Cam-operated carriage*

The opposite end of the intermediate shaft 184 (Figure 5) is connected to a universal joint 187 which is fastened to the timing plate 188 by the pin 189. The timing plate 188 is locked to the cam shaft plate 190 by the T-bolts 191. The cam shaft plate 190 is keyed to the cam shaft 192 and locked in position by the nut 193. The cam shaft 192 is mounted on antifriction bearings 194, which are supported in the cam housing 195 bolted to the transverse slide 96 by the screws 196 and 197. The cam shaft 192 is held in position by the cam shaft plate 190 and the nut 193. The gland 198 serves as an oil seal. Mounted on the cam shaft 192, having a cam carrier 199, is a cam 200 secured thereto by the pin 201 and clamping screws 202 (Figure 6). Bolted to the cam housing 195 are ball bearing guides 203 having balls 204 arranged in grooves therein for supporting the cam roller slide 205. Mounted on the cam roller slide 205 is a bracket 206, which is locked to the cam roller slide by the bolts 207.

The bracket 206 is provided with anti-friction bearings 208 which rotatably support the cam roller stud 209, having the cam roller 210 on one end thereof. The collar 211, pinned thereto, properly positions the cam roller stud 209 (Figure 5). Bolted to one end of the cam roller slide 205 is the arm 212 which rotatably supports the upper swivel 213, which rotates in anti-friction bearings 214 held in position by the cap 215. Mounted on the upper swivel 213 are four ball bearing assemblies 216 (Figures 5, 6, 7 and 28), which are held in position by studs 217. These studs 217 are locked to the swivel by means of screws 218 threaded into the ends of the studs 217, one stud being straight and the other three studs being eccentric. By rotating the eccentric studs 217 (Figure 28) and then tightening them in the desired positions, the clearances of the bearings 216 relatively to the swinging stroke arm 219 can be properly adjusted.

A spring 220, located in the cam housing 195, urges the cam roller slide 205 and its roller 210 against the internal cam 200. An adjusting screw 221 provides for the proper adjustment of the tension of the spring 220. The ball bearing assemblies 216 slidably engage the upper portions of the swinging stroke-adjusting arm 219, which has a stem 222 supported in anti-friction bearings 223 (Figure 5) in the cam housing 195. The anti-friction bearings 223 are held in position by the spacer 224 (Figure 7) and locknut 225 upon the end of the stem, the whole being supported within the bore 226 of the cam housing 195, and covered by the cover plate 227.

Figure 7:
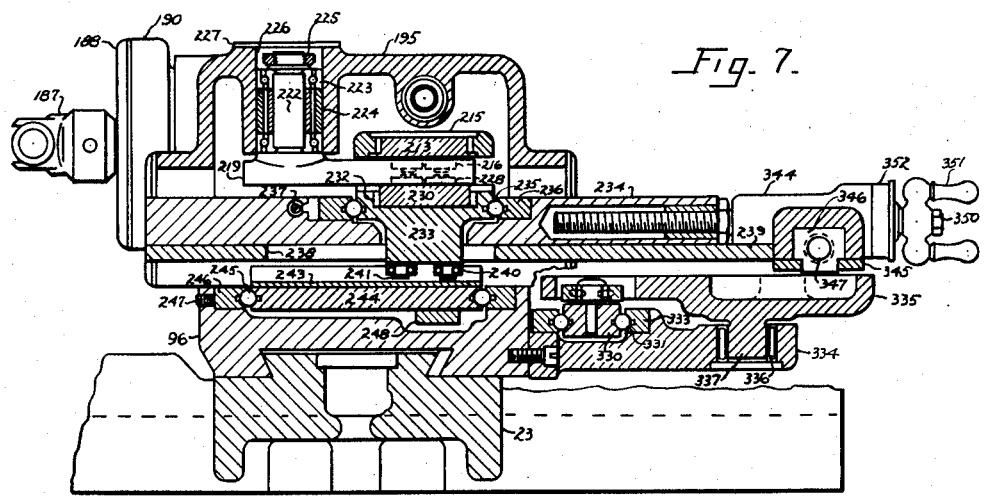
Figure 7 is a vertical section along the line 7—7 in Figure 5.

Engaging the lower portion of the stroke-adjusting arm 219 are four ball bearing assemblies 228, similar in construction to the ball bearing assemblies 216 and similarly engaging the stroke-adjusting arm 219 in such a manner as to slide along the arm. The ball bearing assemblies 228 are mounted upon the studs 229 secured in the lower swivel 230 (Figures 6 and 7) and locked in place by screws 231 in a similar manner to screws 218. One of the studs 229 is straight and the other three are eccentric so that proper clearances may be adjusted and maintained between the bearing assemblies and the stroke-adjusting arm 219. The lower swivel 230 is rotatably mounted in anti-friction bearings 232, mounted in the upper stroke-reciprocating slide 233. The slide 233 is slidably mounted in the hand compensating slide 234 by means of the bearing balls 235 sliding in grooves therebetween. The hand compensating slide 234 is provided with guides 236 adapted to receive these balls 235, and adjustable by the adjustable screw 237 (Figure 7).

The lower part of the stroke-reciprocating slide 233 passes through a slot 238 in the power stroke compensating slide 239, and at its lower end supports four anti-friction bearing assemblies 240 mounted upon studs 241, one of these studs being straight and the others eccentric to provide proper adjustment of their clearances, as previously described in connection with the bearing assemblies 216 and 228. The anti-friction bearing assemblies 240 are arranged to slide in the groove 242 of the shoe 243, which is bolted to the lower stroke-reciprocating slide 244 (Figures 6 and 7), which is slidably supported on balls 245 which roll in grooved guides 246 located on the transverse slide 96, screws 247 being provided for the adjustment thereof. Bolted to the bottom of the lower stroke-reciprocating slide 244 is the reciprocating bar 248 (Figure 7), which transmits the motion of the cam to the compound rest and cutting tool, as hereinafter described. The hand compensating slide 234 and power compensating slide 239 are located in the cam housing 195, and are supported on each end of the cam housing by anti-friction bearings 249 and 250. These bearing assemblies engage the housing 195 and are mounted upon studs 251, one stud being straight and the others being eccentric, in such a manner as to provide a clearance adjustment in the way previously described. The hand compensating slide 234 and the power compensating slide 239 likewise rest upon four anti-friction bearings 252, which are mounted in the cam housing 195 by studs 253, one of these studs being straight and the others being eccentric for an adjustment of the clearance, as previously described.

*Compound rest and tool assembly*

Figure 8:
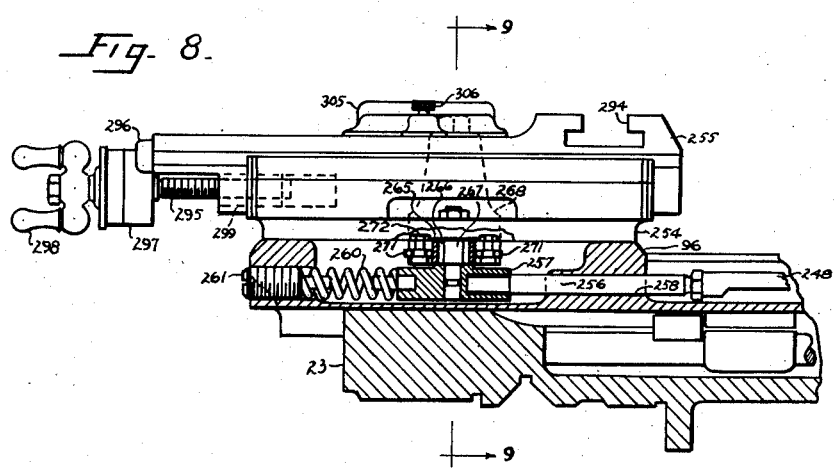
Figure 8 is a side elevation, partly in section, of the compound rest and tool post swivel with its associated mechanism forming a continuation of the mechanism shown in Figure 7.

The compound rest assembly (Figures 8, 9 and 10) consists of a swivel 254 (Figure 8), and having a tool adjusting slide 255 arranged therein. The tool adjusting slide 255 is adapted to be swiveled at any angle, depending upon the work to be machined. The reciprocating bar 248 transmits the cam motion through the rod 256 attached thereto, the opposite end of this rod being secured in the rod slide 257. The rod 256 is reciprocably supported, as at 258, in the transverse slide 96. The rod slide 257 is provided with a spring 260 having an adjusting screw 261 for urging it and the parts associated therewith toward the right, as shown in Figure 8. The spring 260 thus acts in cooperation with the spring 220 (Figure 6) to urge the cam roller 210 against the internal cam 200. The rod slide 257 is supported upon bearing balls 262 (Figure 9) which engage grooved guides 263 and 264 bolted to the transverse slide 96. Mounted on the rod slide 257 is a shoe 265 supported by the anti-friction bearings 266 on the stud 267 (Figure 8).

Arranged to engage this shoe 265 is the lower reciprocating arm 268 supported on anti-friction bearings 269 (Figure 9) which surround the stud 270 mounted in the transverse slide 96. The lower reciprocatng arm 268 carries anti-friction bearing assemblies 271 (Figure 8) supported on studs 272 and adapted to roll on the shoe 265. One of these studs 272 is straight and the other three are eccentric, in the manner previously described for adjusting the clearances.

An upper reciprocating arm 273 (Figure 9) is frictionally associated with the lower reciprocating arm 268. To this end the lower reciprocating arm is provided with a conical portion 274 frictionally engaged by the internal conical portion 275 of the upper reciprocating arm 273. The upper reciprocating arm above its internal conical portion 275 is provided with anti-friction bearings 276, within which is the threaded stud 277 having a threaded sleeve 278. The sleeve 278 is locked in position by the hexagonal collar 279 and set screw 280. The threaded stud 277 is surmounted by a nut 281 which serves as a locknut.

Figure 9:
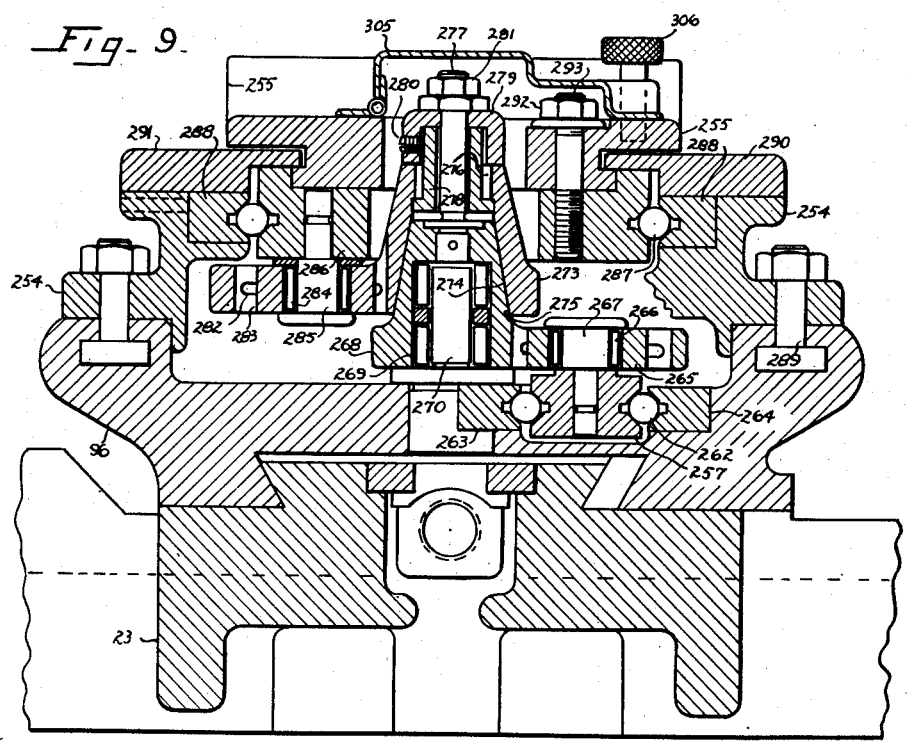
Figure 9 is a vertical section along the line 9—9 in Figure 8, showing the tool post slide and swivel construction.

The upper reciprocating arm 273 is provided with four anti-friction bearing assemblies 282 which roll on the shoe 283 and are locked to the upper reciprocating arm 273, in the same manner as the bearings in the lower reciprocating arm 268. The shoe 283 is mounted on anti-friction bearings 284 surrounding the stud 285 (Figure 9). The latter is mounted in the upper reciprocating slide 286, which is grooved and slidably supported by the bearing balls 287 which roll in grooved guides 288 bolted to the swivel 254. The balls 204, 216, 235, 245, 262 and 287 thus provide an anti-friction bearing support for their associated slides, which is essential for the effective operation of the invention.

Mounted on the upper reciprocating slide 286 is the tool slide 255, which is guided by gibs 290 and 291 attached to the swivel 254. After the proper tool setting has been made, the tool slide 255 is firmly bolted to the upper reciprocating slide 286 by tightening the nut 292 upon the stud 293. The tool slide 255 (Figure 8) carries a T-slot 294 for holding the tool holder and tool, and is also provided with the micrometer adjusting screw 295 mounted in the bracket 296 and having a micrometer dial 297 and hand crank 298 associated therewith. The micrometer screw 295 actuates a nut 299, which is mounted in the upper reciprocating slide 286. The swivel 254 and tool slide 255 may be set at any angle by loosening the swivel clamping bolts 289 and also loosening the nut 281 on the stud 277, which permits the upper reciprocating arm 273 to be lifted away from the conical portion of the lower reciprocating arm 268, leaving the swivel 254 and tool slide 255 free to be rotated to any desired angle.

Compensating mechanism assembly

Mounted on the transverse slide 96 is a bracket 320 which houses the pinion 321, keyed to the tapered sleeve 322 (Figures 10 and 11). The tapered sleeve 322 is supported on anti-friction bearings 323. Mounted on the tapered sleeve 322 is an internally tapered hub 324 carrying a gear 325 held thereagainst by the nut 326. By loosening the nut 326 the gear 325 may be rotated relatively to the shaft 327 carrying the pinion 321. Mounted on the lathe carriage 23 is a rack 328 which meshes with the pinion 321. Supported on the bracket 320 is a rack 329 which meshes with the gear 325. Attached to one end of the rack 329 is the slide 330, slidably supported on the balls 331 which roll in guides 332 and 333. The guides 332 and 333 are bolted to the bracket 334 bolted to the transverse slide 96.

Supported on the bracket 334 is a crank arm 335 supported on a stud 337 which is mounted in anti-friction bearings 336 (Figures 7 and 10), and which is attached to the slide 330. The other end of the crank arm 335 is provided with a milled slot 338 in which anti-friction bearing assemblies 339 slidably roll (Figure 11). The anti-friction assemblies 339 are held (Figure 11) in the shoe 330a by studs 340, three of which are eccentric and the remaining one straight to provide a proper clearance adjustment. The shoe 330a is mounted upon the slide 341 by means of the end cap 342 and is supported relatively thereto upon the anti-friction bearing 343 (Figure 11).

The slide 341 is located in the bracket 344 (Figure 10), which in turn, is bolted to the power compensating slide 239 and held in place by gibs 345. The slide 341 is provided with a threaded nut 346 actuated by the screw 347 which is actuated by the hand crank 348 having the micrometer dial 349 associated therewith. The hand compensating slide 234 is moved relatively to the power stroke compensating slide 239 by means of a screw 350, having a hand crank 351 and micrometer dial 352. This compensating attachment is employed when boring or turning a tapered attachment or shape, or in machining fluting on the face of a work-piece where the diameter is constantly changing. An example of such a work-piece is square with tapered sides. A square work-piece of a certain diameter requires a different stroke to produce a flat side and as the diameter changes, the stroke of the cutting tool must be increased or decreased accordingly. This action is accomplished by the compensating attachment.

Auxiliary head stock mechanism

Associated with the mechanism described above is auxiliary head stock mechanism mounted at the rear of the machine. In Figures 1 and 2 this auxiliary head stock mechanism is employed for the purpose of holding the master length cam, from which the motions are taken to control the operation of the cutting tool or boring tool, upon the work-piece. In Figures 13 and 15, however, this auxiliary head stock mechanism is not used, a two-dimensional cam 200 being employed in connection with the length profile member 65 to produce the master length cam mounted to be driven from the main center 6. In Figures 16 and 17, however, the auxiliary head stock mechanism is employed and mounted so as to be movable bodily, thereby moving the length cam relatively to the work-piece in a longitudinal direction. This construction is employed for making a series of work-pieces of different elongations from a single master length cam.

Bolted to the rearward side of the lathe bed 18 is a double bracket, generally designated 360, having arms 361 and 362. Mounted on the end of this bracket is a horizontal portion 363 having a dove-tail projection 364 which engages a corresponding dove-tail groove 365 in a slidable support 366. The latter is provided with a plurality of T-grooves 367, and is actuated to be moved to and fro by means of the screw shaft 368 (Figure 17), actuated by the hand wheel 369 through the intermediate agency of the nut 370 secured to the sliding support 366 by the set screws 371. Mounted on one end of the sliding support 366 is an auxiliary head stock 375, having a head portion 376 adapted to receive the anti-friction bearings 377 rotatably supporting the auxiliary head stock shaft 378. The shaft 378 is provided at one end with a connection 379 adapted to be connected to the universal joint 187, previously described. The latter has, of course, been disconnected from its previous connection with the cam shaft 192 driving the two-dimensional cam 200.

The opposite end of the shaft 378 carries a head 380 and a center 381 which may be variously arranged either to support a work-piece, as in a chuck, or on a face plate, or between centers. In Figure 2 the head 380 and center 381 are shown as driving the master length cam 382, through the agency of a dog 383. The master length cam 382 is shown enlarged in Figures 20 and 21, and is assumed for the present to be supplied in completed form. The actual making of this master length cam is described subsequently in connection with Figures 13 to 15, inclusive. Meanwhile, it is assumed that the master length cam is to be used in its completed form for the production of a work-piece. The opposite end of the master length cam 382 is supported in the dead center 384 of the auxiliary tail stock spindle 385 of the auxiliary tail stock 386. The auxiliary tail stock spindle 385 is moved to and fro by operating the handle 387 in a manner similar to that previously described for the main tail stock 12. The auxiliary tail stock 386 is clamped in the T-grooves 367 by the T-bolts 388 (Figure 2). The master length cam 382, as will subsequently appear, embodies a partial revolution of the work-piece developed into a complete revolution. Accordingly, the master length cam 382 is not of a reverse configuration to the work-piece intended to be produced therewith, but is of an irregular shape, as shown in Figures 20 and 21.

In using the auxiliary head stock mechanism shown in Figure 2, the cam 200, the cam roller 210 and the cam roller bracket 206 are removed from the cam housing 195 and a length cam follower bracket 389 is bolted, as at 390, (Figure 2) to the cam roller slide 205. Clamped in this cam roller bracket 389 is a length cam follower 391, which is of substantially the same size at its end as is the cutting tool 392 mounted on the boring bar 393 (Figure 2) secured within the tool holder 394 by the clamping bolt 395. The work-piece 396 from which the work-piece is to be made is clamped against the main spindle head 102 so as to be rotated thereby. It will be observed that the work-piece 396 is hollow and has a cavity 397 therein, whereas the length cam 382 is a solid member the configuration of which is reproduced by the length cam follower 391.

*Operation of turning work-piece from master length cam*

With the machine set up, as shown in Figures 1 and 2, the proper change gears between the gears 149 and 171 are selected so as to give the proper speed ratio between the work-piece 396 and the master length cam 382. If the work-piece 396 has one-half its periphery developed into a complete revolution of the master length cam 382 by the procedure hereinafter described in connection with the making of the master length cams, the master length cam 382 will be driven at twice the rotational speed of the work-piece 396. The latter is shown in enlarged cross section in Figures 18 and 19 and is merely one form of work-piece which may be produced by this invention.

The various hand wheels 298, 351 and 369 are adjusted to set the various slides in such positions that the master length cam follower 391, the work-piece 396 and the cutting tool 392 are located in the correct relative positions for starting. After the power is turned on the main spindle head 102 and the auxiliary head 380 are rotated at different speeds, causing rotation of the master length cam 382 and the work-piece 396. The mechanism for moving the carriage 9 likewise causes the latter to move slowly along its ways 17 upon the lathe bed 18. As the carriage 9 moves longitudinally along the bed 18 the length cam follower 391 moves along the profile of the master length cam 382. This motion is transferred to the cam follower slide 205, and through the intermediate mechanism is transmitted to the tool holder 394, the boring bore 393 and cutting tool 392. The configuration of the master length cam 382 is therefore transferred and inverted to produce a multiplicity of inversely corresponding portions upon the work-piece, the number depending upon what portion of a revolution of the work-piece has been developed into the master length cam 382. In a three-sided work-piece, for example, such as one of triangular cross section, one-third of the work-piece would be developed into the cross section of a complete revolution of the master length cam. In the example shown in Figures 18 to 21, inclusive, however, one-half of the work-piece is so developed into a complete revolution of the main length cam.

As the cam follower slide 205 moves in response to the edge profile of the master length cam 382, by way of the follower 391, the arm 212 transfers this motion to the swivel 213, the bearing assemblies 216 of which engage the upper portion of the stroke-reciprocating arm 219 (Figure 6). This action causes the arm 219 to swing about its stem 222 as an axis (Figure 7), imparting this swinging motion to the bearings 228 mounted upon the lower swivel 230. When this occurs the upper stroke-reciprocating slide 233, associated with the lower swivel 230, is caused to swing to and fro in its guideways, transmitting this motion through the bearing assemblies 240 to the shoe 243 mounted upon the lower stroke-reciprocating slide 244 (Figure 7). The latter reciprocates under this action and moves the bar 248, rod 256 and slide 257 to and fro, together with the shoe 265 mounted thereon. In response to this motion the lower reciprocating arm 268 and the upper reciprocating arm 273 are moved around their pivot stud 270, causing the upper reciprocating slide 286 to reciprocate, carrying with it the tool slide 255 (Figures 8 and 9). In this manner the cutting tool 392 is caused to execute the motion which is transmitted to it from the master length cam 382.

The compensating mechanism shown in Figures 10 to 12, inclusive, comes into operation where the diameter of the work-piece is constantly changing, thereby requiring an increase or a decrease of the stroke. This occurs where a tapered work-piece is to be turned, or where fluting is to be formed on the face of the work-piece. In preparing this compensating mechanism for use the operator tightens the nut 326 (Figure 10), locking the gears 321 and 325 together. After this he sets the slide 344 for the proper stroke, and the hand adjusting slide 234 for the given stroke. The transverse slide 96 is then started in its feeding motion as the carriage 9 moves it in response to the contour of the length cam 382. This causes the pinion 321 to revolve by reason of its engagement with the stationary rack 328 (Figures 10 and 12), thereby revolving the gear 325 and reciprocating the rack 329. As the ratio between the two gears 321 and 325 is two to one, the rack 329 will move twice as fast as the transverse slide 96.

As the rack 329 and the slide 330 move (Figure 7), the crank arm 335 rotates about its axis stud 337, causing the power stroke compensating slide 239 and hand compensating slide 234 to move inwardly. This action causes the stroke-reciprocating slide 233 to move toward the center of the stem 222 (Figure 7), thereby transmitting its thrust upon a reduced radius or lever arm along the stroke arm 219, thereby transmitting a shorter stroke to the tool slide 255 and to the tool 392. By this compensating mechanism, shown in Figures 10 and 12, a tapered work-piece is properly machined because the stroke of the tool slide 255 is automatically changed as the taper changes upon the work-piece.

*Making master length cam from cross sectional cam*

Hitherto its has been assumed that the master length cam has been supplied in completed form. The master length cam itself, however, is prepared with the apparatus arranged as shown in Figures 13 to 15, inclusive. With this arrangement the auxiliary drive shaft 184 is disconnected from the auxiliary head stock connection 379 (Figure 2) and reconnected to the timing plate 188 by the pin 189, in the manner previously shown in Figure 5. The cross sectional cam 200 is reclamped to the cam carrier 199 and the cam follower 210 is likewise replaced on the cam follower slide 205 (Figure 5).

The cross sectional cam or two-dimensional cam 200 is made by developing a partial revolution only of a representative cross section of the work-piece into a complete revolution, as disclosed and claimed in the copending application of Bickel and Wills, Ser. No. 97,959, filed August 26, 1936. The contour of the edge 64 of the length profile member 65 (Figure 13) is chosen to reproduce a profile inverse to that of the work-piece shown in Figure 18. This length profile member 65, so formed, is shown in Figure 22 and the apparatus in its arrangement ready to start the machining operation is shown in Figures 13 and 15. For this purpose the incompleted master length cam 382 is mounted between the main live and dead centers 6 and 13, and driven by the dog 398 from the main spindle head 102. The change gears between the gears 149 and 171 are then selected so as to give an even ratio between the cross sectional cam 200 and the master length cam 382. A tool post 399 carries a tool holder 400 with a cutting tool 401 in engagement with the master length cam 382 (Figure 15).

The machine is then started in operation, whereupon the cross sectional cam 200 rotates and imparts its motion to the cam follower 210, thereby operating the cam slide 205 and the intermediate mechanism to move the cutting tool 401 inwardly or outwardly as the cam 200 directs. At the same time the carriage 9 moves longitudinally along its bed 18, causing the follower roller 63 to move along the edge 64 of the length profile member 65. This motion is transmitted to the operating bar 58 and thence to the tool 401, in the manner previously described. Thus, by the arrangement of Figures 13 to 15, inclusive, the cross sectional cam 200 reproduces a representative cross section of the work-piece and develops it into a cross section of the master length cam 382, whereas the length thereof is governed by the configuration of the edge 64 of the length profile member 65. The result is shown for a typical length cam in Figures 20 and 21.

It will be understood that the length cam 382 here shown is provided with end portions 402 and 403 having centers 404 and 405 for receiving the opposite centers of the machine. The line of centers between 404 and 405 is not the center line of symmetry of the master length cam itself, as is clearly shown in Figure 20. The work-piece produced by the master length cam 382 shown in Figures 20 and 21 is shown in cross section in Figures 18 and 19, and on a reduced scale in Figures 1 and 2, this being a hollow work-piece.

The same arrangement, however, may be employed to produce the solid work-piece 406 shown in Figures 23 and 24. In this case, however, the work-piece 406 is provided with externally fluted portions 407 and arcuate portions 408 therebetween. As this work-piece has a roughly three-sided appearance, one-third of it is developed, as shown in Figure 24, into a complete revolution of the master length cam, as shown in Figure 25. The master length cam 409, shown in Figures 25 and 26, however, is of an opposite configuration to that shown in Figures 20 and 21, and the length profile member 410 employed to produce it has an opposite direction of its edge 411. The work-pieces, cams, length cams, etc. shown in Figures 18 to 27, inclusive, are however, merely two examples among the many varieties which can be produced by this machine.

*Modified auxiliary head stock mechanism for producing elongated work-pieces*

In Figures 16 and 17 is shown a modified construction for the auxiliary head stock mechanism, whereby the latter is moved bodily in a longitudinal direction as the carriage 9 likewise moves longitudinally. The purpose of this is to enable the employment of a single master length cam for producing a variety of work-pieces of different elongations but of similar cross sections. This demand frequently arises where patterns are to be made for bottle molds where the bottles are to be of roughly the same appearance, but with different lengths so as to have different capacities. For this purpose the auxiliary head stock mechanism is provided with a feeding motion for its support, this arrangement being shown in Figures 16 and 17. Where the same elements are employed, as in Figures 1 and 2, however, the same reference numerals are used.

In the modified arrangement of Figure 16 a rack 412 is bolted to the under side of the carriage 9 (Figure 16), and drives a pinion 413 secured to the horizontal shaft 414. The latter is mounted in anti-friction bearings 415 within a tubular housing portion 416, which is a part of a bifurcated bracket 417 generally similar to the bracket 360 shown in Figure 2. To the shaft 414, at its opposite end however, is secured a gear 418 arranged to mesh with a pinion 419 secured to one end of a shaft 420 journaled in anti-friction bearings 421. This shaft 420 carries a bevel gear 422 meshing with a bevel pinion 423 (Figure 17), supported upon the stud 424 mounted on the socket 425. Secured to the hub 426 of the bevel pinion 423 is a gear 427 which meshes with a pinion 428 upon the screw shaft 368. The latter is supported at its opposite ends in the bores 430 and 431 (Figure 17) of the bracket portion 363. The screw shaft 368 engages the threads of the nut 370, secured by the set screws 371 to the sliding support 366, as previously described. The bracket portion 363 carries a hand wheel 369 by which the screw shaft 368 may be rotated manually. The remainder of the auxiliary headstock construction is the same as that described in connection with Figures 1 and 2. A cover plate 432 (Figure 16) covers the gears 418 and 419, these being adapted to be replaced by other gears to give a different driving ratio.

In operating the modified arrangement shown in Figures 16 and 17, the machine is started in motion in the manner previously described. As the carriage 9 moves longitudinally along its ways 17 in the bed 18, the rack 412, bolted to the carriage 9, will rotate the pinion 413. The consequent rotation of the shaft 414, the gear 418, the pinion 419, the shaft 420, the bevel gear 422, the bevel pinion 423, the gear 427 and the pinion 428 actuates the screw shaft 368 to rotate it and to move the nut 370 and the sliding support 366 longitudinally by an automatic motion. This arrangement thus acts as an extension attachment for the machine so as to enable a given master length cam to be employed for producing a plurality of work-pieces of different elongations. If, for example, the master length cam is six inches in length and it is desired to bore a work-piece of the same general cross sectional configuration but nine inches in length, the mechanism of Figures 16 and 17 will be so arranged and the gears so chosen that the sliding support 366 will move three inches while the carriage 9 and cutting tool 392 move nine inches. In this manner the six-inch master length cam 382 is made to give the effect of a nine-inch master length cam without requiring the additional production of such a cam. This modified arrangement enables great economy in the production of such work-pieces by enabling a given master length cam to be used for producing a multiplicity of work-pieces.

It will be understood that it is desired to comprehend within this invention such modifications as come within the scope of the claims and the invention.

Having thus fully described the invention, what is claimed as new and desired to be secured by Letters Patent, is:

1. In combination, means for rotating a work-piece, a cutting tool, asymmetrical three-dimensional cam means, means for rotating said cam means, a follower engaging said cam means, said cam means having a cross sectional periphery of varying radius from its axis of rotation equivalent for a complete revolution to a partial revolution of the work-piece made therewith and having a longitudinal profile disposed asymmetrically relatively to said axis of rotation, mechanism operatively interconnecting said follower and said cutting tool, power-operated means synchronized with the motion of said work-piece-rotating means for moving said follower and said cam means relatively to one another axially of said cam means, and means for rotating said cam means relatively to said work-piece rotating means at a speed ratio equivalent to the fractional part of the work-piece developed from a complete revolution of said cam means.

2. In combination, means for rotating a work-piece, a cutting tool, asymmetrical three-dimensional cam means, means for rotating said cam means, a follower engaging said cam means, said cam means having a cross section of varying radius from its axis of rotation and having a longitudinal profile disposed asymmetrically relatively to said axis of rotation, compensatory mechanism adapted to vary the stroke of said cutting tool from the stroke imparted to said follower by said cam means, and power-operated means synchronized with the motion of said work-piece-rotating means for moving said follower and said cam means relatively to one another axially of said cam means.

3. In combination, means for rotating a work-piece, a cutting tool, asymmetrical three-dimensional cam means, means for rotating said cam means, a follower engaging said cam means, said cam means having a cross section of varying radius from its axis of rotation and having a longitudinal profile disposed asymmetrically relatively to said axis of rotation, compensatory mechanism adapted to vary the stroke of said cutting tool from the stroke imparted to said follower by said cam means in response to the tapering of said cam means, and power-operated means synchronized with the motion of said work-piece rotating means for moving said follower and said cam means relatively to one another axially of said cam means.

4. In combination, means for rotating a work-piece, a cutting tool, asymmetrical three-dimensional cam means, means for rotating said cam means, a follower engaging said cam means, said cam means having a surface varying in distance both transversely and longitudinally from its axis of rotation and disposed asymmetrically relatively to said axis of rotation, mechanism operatively interconnecting said follower and said cutting tool, and power-operated means synchronized with the motion of said work-piece-rotating means for moving said follower and said cam means relatively to one another axially of said cam means.

5. In combination, means for rotating a work-piece, a cutting tool, three-dimensional cam means, means for rotating said cam means, a follower engaging said cam means, mechanism operatively interconnecting said follower and said cutting tool, means for moving said follower and said cam means relatively to one another axially of said cam means, and means synchronizingly driven with respect to said work-piece-rotating means for additionally moving said cam-rotating means and said cam means bodily in an axial direction.

6. In combination, means for rotating a work-piece, a cutting tool, three-dimensional cam means, means for rotating said cam means, a follower engaging said cam means, a support for said cam-rotating means, mechanism operatively interconnecting said follower and said cutting tool, means for moving said follower and said cam means relatively to one another axially of said cam means, and means synchronizingly driven with respect to said work-piece-rotating means for additionally moving said cam-rotating means in an axial direction.

7. In combination, means for rotating a work-piece, a cutting tool, three-dimensional cam means, means for rotating said cam means, a follower engaging said cam means, mechanism operatively interconnecting said follower and said cutting tool, means for moving said follower and said cam means relatively to one another axially of said cam means, and means synchronizingly driven with respect to said work-piece-rotating means for additionally moving said cam means axially during said relative motion of said follower and said cam means.

8. In combination, means for rotating a work-piece, a cutting tool, three-dimensional cam means, means for rotating said cam means, a follower engaging said cam means, mechanism operatively interconnecting said follower and said cutting tool, means for moving said follower and said cam means relatively to one another axially of said cam means, and power-operated means synchronizingly driven with respect to said work-piece-rotating means for additionally moving said cam means axially during said relative motion of said follower and said cam means.

9. In combination, means for rotating a work-piece, a cutting tool, three-dimensional cam means, means for rotating said cam means, a follower engaging said cam means, mechanism operatively interconnecting said follower and said cutting tool, means for moving said follower and said cam means relatively to one another axially of said cam means, and means for elongating the work-piece relatively to said cam means comprising means synchronizingly driven with respect to said work-piece-rotating means for additionally moving said cam means axially in timed relationship with said relative motion of said follower and said cam means.

10. In combination, means for rotating a work-piece, a cutting tool, three-dimensional cam means, means for rotating said cam means, a follower engaging said cam means, mechanism operatively interconnecting said follower and said cutting tool, means for moving said follower and said cam means relatively to one another axially of said cam means, and means synchronizingly driven with respect to said work-piece-rotating means for additionally moving said cam means longitudinally at a predetermined relative speed while moving said cam means and said follower relatively to one another.

11. In combination, means for rotating a work-piece, a cutting tool, three-dimensional cam means, means for rotating said cam means, a follower engaging said cam means, mechanism operatively interconnecting said follower and said cutting tool, means for moving said follower and said cutting tool longitudinally of said cam means, and means synchronizingly driven with respect to said work-piece-rotating means for additionally moving said cam means relatively to said follower whereby to cause said cutting tool to cut an elongated work-piece from a given cam means.

12. In combination, means for rotating a work-piece, a cutting tool, three-dimensional cam means, means for rotating said cam means, a bed, a carriage movable along said bed, a follower and a cutting tool associated with said carriage and adapted to engage said cam means and the work-piece respectively, mechanism associated with said carriage for operatively interconnecting said follower and said cutting tool, means for moving said carriage longitudinally of said cam means, and compensatory mechanism adapted to vary the stroke of said cutting tool from the stroke imparted to said follower by said cam means in response to the tapering of said cam means in a longitudinal direction.

13. In combination, means for rotating a work-piece, a cutting tool, elongated three-dimensional cam means having a cross sectional periphery disposed asymmetrically around the axis of rotation thereof, means for rotating said cam means at a predetermined number of revolutions for each revolution of said work-piece-rotating means, a bed, a carriage movable along said bed, a slide arranged to move transversely of said carriage, a follower and a cutting tool associated with said slide and adapted to engage said cam means and the work-piece respectively, mechanism associated with said slide for operatively interconnecting said follower and said cutting tool, and means for moving said carriage longitudinally relatively to said cam means.

14. In combination, means for rotating a work-piece, a cutting tool, elongated three-dimensional cam means having a cross sectional periphery disposed asymmetrically around the axis of rotation thereof, means for rotating said cam means at a predetermined number of revolutions for each revolution of said work-piece-rotating means, a bed, a carriage movable along said bed, a slide arranged to move transversely of said carriage, a follower and a cutting tool associated with said slide and adapted to engage said cam means and the work-piece respectively, mechanism associated with said slide for operatively interconnecting said follower and said cutting tool, and means for moving said carriage longitudinally relatively to said cam means, said cam means having a cross sectional contour developed as an entire revolution from a partial revolution of the work-piece.

15. In combination, means for rotating a work-piece, a cutting tool, elongated three-dimensional cam means having a cross sectional periphery disposed asymmetrically around the axis of rotation thereof, means for rotating said cam means at a predetermined number of revolutions for each revolution of said work-piece-rotating means, a bed, a carriage movable along said bed, a slide arranged to move transversely of said carriage, a follower and a cutting tool associated with said slide and adapted to engage said cam means and the work-piece respectively, mechanism associated with said slide for operatively interconnecting said follower and said cutting tool, and means for moving said carriage longitudinally relatively to said cam means, said cam means having a cross sectional contour developed as an entire revolution from a partial revolution of the work-piece and said cam means being arranged to rotate at a speed greater than the work-piece by the number of times which is the reciprocal of the fraction of the work-piece developed into an entire revolution of said cam means.

16. In combination, means for rotating a work-piece, a cutting tool, elongated three-dimensional cam means having a cross sectional periphery disposed asymmetrically around the axis of rotation thereof, means for rotating said cam means at a predetermined number of revolutions for each revolution of said work-piece-rotating means, a bed, a carriage movable along said bed, a slide arranged to move transversely of said carriage, a follower and a cutting tool associated with said slide and adapted to engage said cam means and the work-piece respectively, mechanism associated with said slide for operatively interconnecting said follower and said cutting tool, means for moving said carriage longitudinally relatively to said cam means, said cam means having a cross sectional contour developed as an entire revolution from a partial revolution of the work-piece and said cam means being arranged to rotate at a speed greater than the work-piece by the number of times which is the reciprocal of the fraction of the work-piece developed into an entire revolution of said cam means, and changeable speed devices arranged between said work-piece rotating means and said cam-rotating means for adjusting the relative speed ratio therebetween to said fraction.

17. In combination, means for rotating a work-piece, a cutting tool, three-dimensional cam means, means for rotating said cam means, a bed, a carriage movable along said bed, a follower and a cutting tool associated with said carriage and adapted to engage said cam means and the work-piece respectively, mechanism associated with said carriage for operatively interconnecting said follower and said cutting tool, means for moving said carriage longitudinally of said cam means, a support for said cam means and said cam-rotating means, and means synchronizingly driven with respect to said work-piece-rotating means for moving said support longitudinally of said bed.

18. In combination, means for rotating a work-piece, a cutting tool, three-dimensional cam means, means for rotating said cam means, a bed, a carriage movable along said bed, a follower and a cutting tool associated with said carriage and adapted to engage said cam means and the work-piece respectively, mechanism associated with said carriage for operatively interconnecting said follower and said cutting tool, means for moving said carriage longitudinally of said cam means, a support for said cam-rotating means, and power-operated means synchronizingly driven with respect to said work-piece-rotating means for moving said support longitudinally of said bed at a predetermined speed.

19. In combination, a work-piece rotating spindle, an auxiliary spindle, means for driving said spindles at different predetermined speed ratios, a rotatable pattern element of elongated tapering form mounted for rotation on said auxiliary spindle, a cutting tool adjacent the work-piece in said main spindle, a follower member arranged to engage said pattern element, power-driven means synchronized with the motion of said work-piece rotating spindle for moving said follower member and said pattern element axially relatively to one another, and means for transmitting the motion of said follower member to said cutting tool in response to the configuration of said element, said motion transmitting means including compensatory devices for altering the stroke of said cutting tool from the stroke imparted to said follower member in conformity with the tapering effect of said pattern element.

CLIFFORD A. BICKEL.